(12) United States Patent
Kim et al.

(10) Patent No.: US 11,580,101 B2
(45) Date of Patent: Feb. 14, 2023

(54) METHOD AND APPARATUS FOR GENERATING CONTEXT CATEGORY DATASET

(71) Applicant: KOREA ADVANCED INSTITUTE OF SCIENCE AND TECHNOLOGY, Daejeon (KR)

(72) Inventors: Juho Kim, Daejeon (KR); Hyunwoo Kim, Daejeon (KR); Eun-Young Ko, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/148,924

(22) Filed: Jan. 14, 2021

(65) Prior Publication Data
US 2021/0286810 A1    Sep. 16, 2021

(30) Foreign Application Priority Data

Mar. 10, 2020  (KR) .................. 10-2020-0029339
Oct. 30, 2020  (KR) .................. 10-2020-0143376

(51) Int. Cl.
*G06F 16/00*    (2019.01)
*G06F 16/242*   (2019.01)
(Continued)

(52) U.S. Cl.
CPC .... *G06F 16/2438* (2019.01); *G06F 16/24522* (2019.01); *G06F 16/285* (2019.01)

(58) Field of Classification Search
CPC ...... G06N 3/0454; G06N 3/08; G06N 3/0445; G06N 20/00; G06N 20/20; G06N 3/006; G06N 3/0427; G06N 3/088; G06N 5/003; G06N 5/02; G06N 5/045; G06K 9/6256; G06K 9/6262; G06K 9/52; G06K 9/6202; G06K 9/6218; G06K 9/6228; G06K 9/6232; G06K 9/6234; G06K 9/6257; G06K 9/6259; G06K 9/6264; G06K 9/627; G06K 9/6271; G06K 9/6272; G06K 9/6296; G06K 9/66; G06F 11/3692; G06F 16/334; G06F 16/51; G06F 40/40; G06F 40/56; G06F 16/9535; G06F 40/169; G06F 40/211; G06F 1/1626; G06F 1/1694; G06F 16/212; G06F 16/278; G06F 16/285; G06F 16/288; G06F 16/70; G06F 16/88; G06F 16/90324; G06F 16/904; G06F 16/958; G06F 2200/1637; G06F 3/017; G06F 3/04883;
(Continued)

(56) References Cited

U.S. PATENT DOCUMENTS

2014/0337257 A1    11/2014  Chatterjee et al.
2017/0164011 A1*   6/2017   Rimon ................ H04N 21/232
(Continued)

*Primary Examiner* — Shyue Jiunn Hwa
(74) *Attorney, Agent, or Firm* — Harness, Dickey & Pierce, P.L.C.

(57) ABSTRACT

The present disclosure provides an apparatus for and method of generating a context category dataset. According to some embodiments, the present disclosure provides a context category dataset generating apparatus and method which predict a context category to which a user-inputted hashtag belongs, receive from the user the user's context category to which the hashtag belongs, and generate and update the context category dataset.

14 Claims, 4 Drawing Sheets

(51) Int. Cl.
*G06F 16/28* (2019.01)
*G06F 16/2452* (2019.01)

(58) Field of Classification Search
CPC ....... G06F 40/279; G06F 40/30; G06V 10/42;
G06V 10/751; G06V 10/82; G06V 20/20;
G06V 30/194
See application file for complete search history.

(56) References Cited

U.S. PATENT DOCUMENTS

| | | | |
|---|---|---|---|
| 2018/0246983 A1* | 8/2018 | Rathod | G06F 16/9566 |
| 2019/0188590 A1* | 6/2019 | Wu | H04L 51/02 |
| 2020/0250249 A1* | 8/2020 | Fedoryszak | H04L 51/32 |

* cited by examiner

METHOD AND APPARATUS FOR GENERATING CONTEXT CATEGORY DATASET

CROSS-REFERENCE TO RELATED APPLICATIONS

This application is based on, and claims priority from, Korean Patent Application Number 10-2020-0029339, filed Mar. 10, 2020 and Korean Patent Application Number 10-2020-0143376, filed Oct. 30, 2020, the disclosures of each of the above applications are incorporated herein by reference.

TECHNICAL FIELD

The present disclosure in some embodiments relates to an apparatus for and method of generating a context category dataset.

BACKGROUND

The statements in this section merely provide background information related to the present disclosure and do not necessarily constitute prior art.

Natural language processing technologies are advancing along with applications such as text generation, natural language generation, and intelligent agents. Yet, difficulties persist in providing a dataset capable of designing and training models used in natural language processing and applications.

One of the methods of generating a dataset capable of designing or training a model is to use a crowdsourcing method. A compound word of crowd and outsourcing, crowdsourcing means engaging the public in various production activities, including data collection. Crowdsourcing can shorten the time spent in the production process by engaging the majority in production activities.

However, the crowdsourcing method takes cost and time in proportion to the size of the data to be generated, and recently, there are increasing attempts to employ the method of producing a dataset by using machine prediction of an artificial intelligence (AI) model. However, a dataset generated by machine prediction is disadvantageously lower in accuracy than that of a dataset generated through classifying or labeling by a human in person.

Accordingly, in recent years, the classification or labeling of data by using a human-machine collaboration method has been introduced. This human-machine collaboration takes place in the form of a machine preemptively presenting the classification or labeling prediction result which is then reviewed by a human. This collaboration method is expected to be particularly helpful in the technical field related to natural language processing and applications described above in that it uses feedback from humans.

Therefore, there is a need to devise a dataset generation method for natural language classification by using a human-machine collaboration method.

SUMMARY

According to at least one embodiment, the present disclosure provides an apparatus for generating a context category dataset by using a user interface including a list provider configured to provide a hashtag list for each context category, and a category prediction unit configured to use word embedding vectors each generated for each context category based on the hashtag list to predict one or more context categories of one or more hashtags inputted from the user interface. Here, the user interface is configured to provide a predicted context category to a user and to receive and provide context category information from the user to the list provider.

According to another embodiment, the present disclosure provides a method of generating a context category dataset, including the steps of generating word embedding vectors each for each of context categories based on a hashtag list for each of the context categories, receiving one or more hashtags inputted from a user interface, predicting one or more context categories of the one or more hashtags by using the word embedding vectors, providing one or more predicted context categories to a user through the user interface, receiving context category information inputted from the user, and renewing or updating the hashtag list based on the context category information.

DETAILED DESCRIPTION

Figure 1:
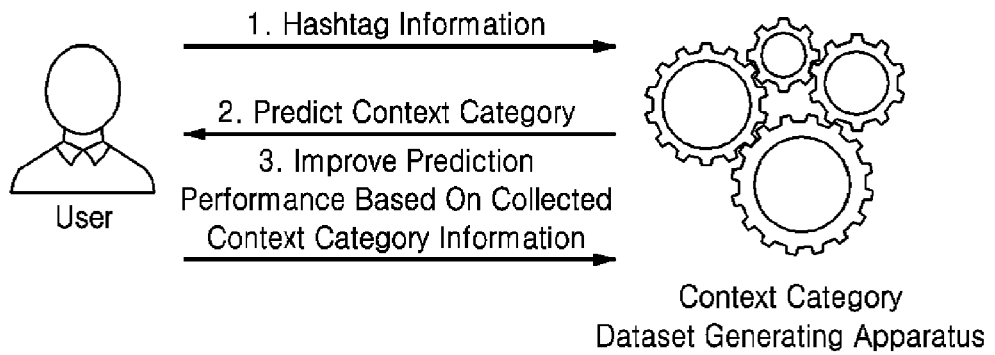
FIG. 1 is a conceptual diagram illustrating a process of generating a context category dataset according to at least one embodiment of the present disclosure.

The present disclosure in some embodiments seeks to provide a context category dataset generating apparatus and method which predict a context category to which a user-inputted hashtag belongs, receive from the user the user's context category to which the hashtag belongs, and generate and update the context category dataset.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, various terms such as second, first, etc., are used solely for the purpose of differentiating one component from the other but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to a unit for processing at least one function or operation, which may be implemented by hardware, software, or a combination thereof.

The detailed description to be disclosed hereinafter together with the accompanying drawings is intended to describe illustrative embodiments of the present disclosure and is not intended to represent the only embodiments in which the present disclosure may be practiced.

In the present disclosure, the context category dataset refers to a dataset that provides a hashtag having contextual connectivity with a specific category or words of such a hashtag. This context category dataset is generated by presenting a user with a machine prediction result for a context category to which the hashtag belongs and receiving a review result from the user and thereby improving the accuracy of the context category prediction. The context category dataset in the present disclosure is generated and collected by a human-machine crowdsourcing method.

The context category dataset of the present disclosure will be described on the premise that it is configured as a hashtag list according to the context category. However, the data structure of the context category dataset is not necessarily limited to the list structure, and others such as a tree and a hash table may be the data structure of the context category dataset in this disclosure as long as it can store and manage (e.g., generate, delete, search, traversal, reference, etc.) hashtags belonging to the context category.

In the present disclosure, it is assumed that there may be at least one or multiples of each of a context category, an element of a category list, a hashtag belonging to the hashtag information, and a context category belonging to the context category information.

FIG. 1 is a conceptual diagram illustrating a process of generating a context category dataset according to at least one embodiment of the present disclosure.

Upon receiving, from its user, hashtag information composed of one or more hashtags, a context category dataset generating apparatus presents the user with one or more context category to which the respective hashtags of the hashtag information are expected to belong. The prediction of the context category is performed by using a word embedding vector generated based on the hashtag list of each context category. Here, the word embedding vector is a position of a context category in an embedding vector space and is a vector that is calculated based on embedding vectors obtained by word-embedding the category list elements of the context category. Such a word embedding vector may be obtained, for example, by calculating each centroid from each cluster composed of embedding vectors of hashtag list elements each corresponding to each context category.

The user selects a context category for each hashtag based on the context category presented from the context category dataset generating apparatus. In particular, by making the same selection as the presented context category or by modifying all or some of the presented context category, the user may provide the context category dataset generating apparatus with the context category for each hashtag as context category information. The context category dataset generating apparatus updates the context category dataset based on the provided context category information and previous hashtag information to improve the prediction accuracy of the context category. This update may be performed according to the context category information, for example, by adding a hashtag or each of the words of the hashtag as a new element to the hashtag list of each context category or replacing an existing element.

Figure 2:
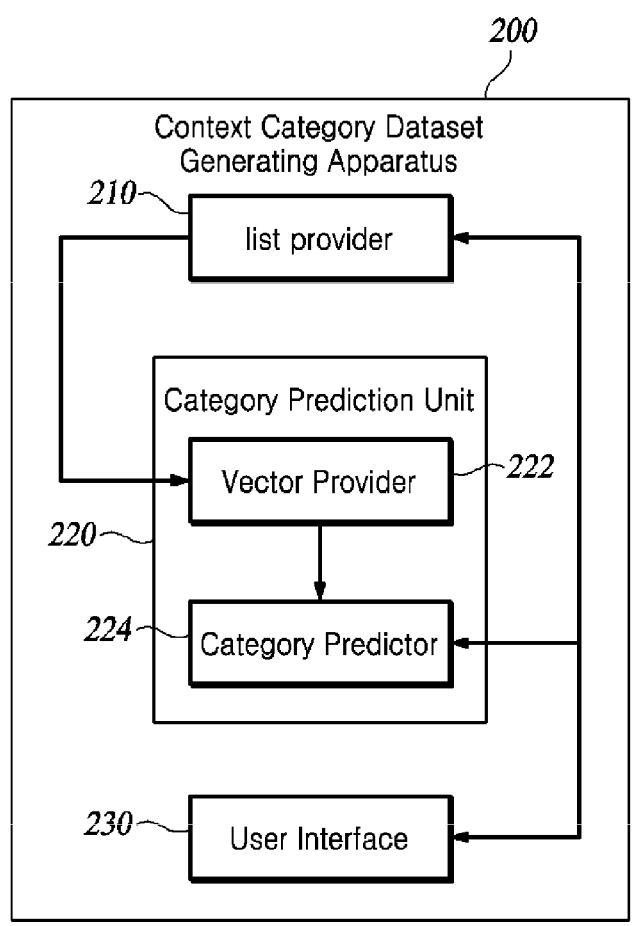
FIG. 2 is a block diagram illustrating a context category dataset generating apparatus according to at least one embodiment of the present disclosure.

FIG. 2 is a block diagram illustrating a context category dataset generating apparatus according to at least one embodiment of the present disclosure.

A context category dataset generating apparatus 200 according to at least one embodiment of the present disclosure includes all or some of a list provider 210, a category prediction unit 220, and a user interface 230. The context category dataset generating apparatus 200 shown in FIG. 2 is according to at least one embodiment of the present disclosure, and not all components shown in FIG. 2 are essential components, and some components may be added, changed, or deleted. For example, in another embodiment, the context category dataset generating apparatus further includes a performance estimate unit (not shown) that performs performance evaluation of the context category prediction used for regeneration of the word embedding vector of each context category.

FIG. 2 illustrates the context category dataset generating apparatus 200 as a hardware device, but this is for the convenience of description. In another embodiment, the context category dataset generating apparatus includes may be implemented as a software module or a processor that performs the functions of the respective components 210 to 230.

The list provider 210 generates and manages, as a context category dataset, hashtag lists for respective context categories and provides the same to the category prediction unit 220. The list provider 210 may generate a hashtag list of a new context category based on hashtag information and context category information inputted from the user interface 230, or it may update the hashtag list of the existing context category.

The list provider 210 may generate and update a hashtag list after preprocessing the hashtag information. Such preprocessing may be, but not limited to, a task of, for example, transforming each hashtag included in the hashtag information into uppercase or lowercase letters en bloc, removing spaces or special characters included in each hashtag, or stochastically classifying such hashtag constituents as a plurality of words and characters, and a combination of words and numbers.

The category prediction unit 220 operates based on the hashtag list provided by the list provider 210 to use the word embedding vectors generated for each of the context categories, for predicting one or more context categories of respective hashtags in the hashtag information inputted from the user interface 230. Here, the meaning of predicting the context category of respective hashtags in the hashtag information means predicting one or more context categories to which each hashtag included in the hashtag information belongs. Specifically, the category prediction unit 220 includes all or some of a vector provider 222 for generating or updating all or some of the word embedding vectors of the respective context categories and a category predictor 224 for predicting one or more context categories of respective hashtags hashtag information by calculating the probability for each context category that each hashtag belongs to the specific context category. However, not all components shown in FIG. 2 are essential components, and some components may be added, changed, or deleted.

When generates the first hashtag list, the vector provider 222 is responsive for generating a cluster composed of embedding vectors of one or more basic tags preset in each of the hashtag lists on a predefined embedding vector space. The embedding vectors was/are generated by performing word embedding on the one or more basic tags. The dimension of the embedding vector space may be redefined by a parameter preset in the vector provider 222, a minimum dimension required for word embedding, or a prediction performance of the category predictor 224 among other factors. The vector provider 222 sets the centroid of each cluster as a word embedding vector of a relevant context category. Each set word embedding vector may be updated by reflecting an embedding vector of an element added to a relevant hashtag list. For example, the vector provider 222 may find a new centroid whenever the number of elements newly added to the hashtag list of a specific context category becomes a preset number and reassign the new centroid as the word embedding vector of the relevant context category.

The category predictor 224 generates embedding vectors of the respective hashtags in the hashtag information and calculate, for each hashtag, a distance from each of the generated embedding vectors of the hashtags to each of the word embedding vectors of the context categories and thereby calculate the probability that a relevant hashtag belongs to each of the context categories. Specifically, to generate the embedding vectors of the respective hashtags, the category predictor 224 calculates the distance between each extracted embedding vector and each word embedding vector when embedding vectors of hashtags are available for extraction from the hashtag information. The category predictor 224 calculates the distance between each word embedding vector and a obtained embedding vector, the calculated result of vector addition on the embedding vectors of respective words which are classified by word-by-word from the hashtags when no embedding vectors of hashtags are available for extraction. The category predictor 224 may use the calculated distances as the basis for providing the user interface 230 with the top one or more (or N) context categories that have the shorter distance, as predicted context categories of the relevant hashtag.

Alternatively, the category predictor 224 may calculate a probability that each hashtag in the hashtag information belongs to each of the context categories by normalizing the calculated distance for each relevant context category and provide the user interface 230 with all or some of the context categories that have the probability calculated to be equal to or greater than a preset threshold value, as the predicted context categories of the relevant hashtag.

The user interface 230 relays hashtag information inputted from the user to the list provider 210 and/or the category prediction unit 220 and then provides the user with the predicted context category from the category prediction unit 220 and thereafter relays context category information received from the user to the list provider 210. The user interface 230 will be given a specific illustration referring to FIG. 4 below.

Figure 3A:
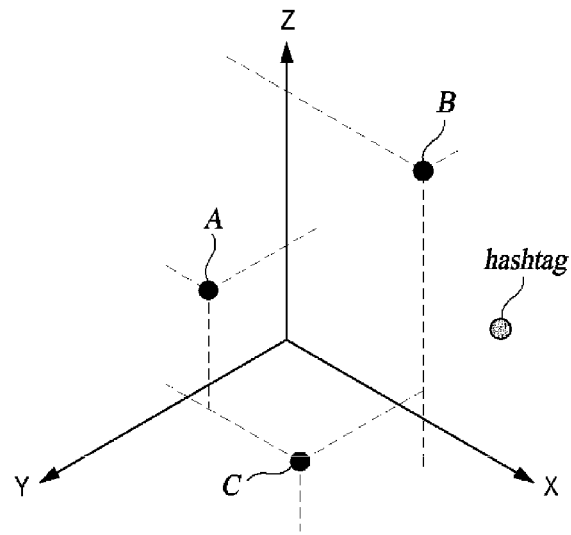
FIGS. 3A and 3B are diagrams illustrating word embedding vectors and embedding vectors of hashtag information according to at least one embodiment of the present disclosure.
Figure 3B:
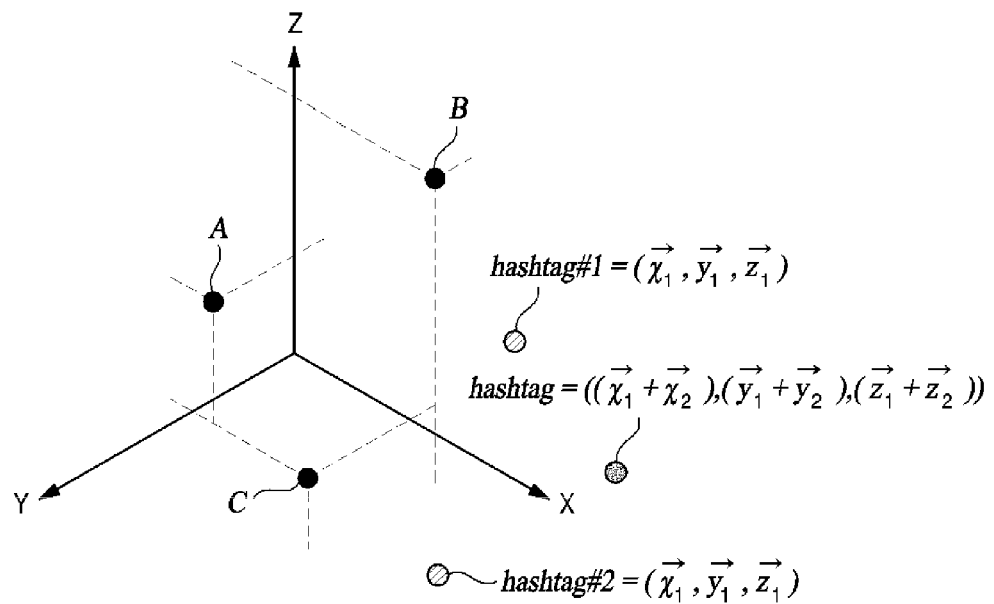

FIGS. 3A and 3B are diagrams illustrating word embedding vectors and embedding vectors of hashtag information according to at least one embodiment of the present disclosure.

FIGS. 3A and 3B illustrate A, B, and C which are word embedding vectors of a context category, showing centroids of clusters composed of embedding vectors of relevant hashtag list elements in a three-dimensional embedding vector space. In FIGS. 3A and 3B, the embedding vector space is illustrated as a three-dimensional space, but the dimension of the embedding vector space may be greater than, lower than or equal to three dimensions, which is evident.

In the hashtag information inputted by the user through the user interface (the hashtags of FIGS. 3A and 3B), FIG. 3A shows a case where the embedding vectors of respective hashtags included in the hashtag information are extractable from the embedding vector space, and FIG. 3B illustrates they are not available for extraction. Here, the meaning of extracting the embedding vectors of the hashtag information means extracting the embedding vectors for the respective hashtags included in the hashtag information, and whether an embedding vector is extractable or not may vary even among the hashtags included in the same hashtag information.

When the embedding vectors are extractable, the context category dataset generating apparatus extracts the embedding vectors from the hashtag information. However, when no embedding vectors of respective hashtags are extractable, the context category dataset generating apparatus assumes that the hashtag information or the hashtags are composed of a plurality of words and utilizes an algorithm, library, or other means for classifying the words included in the hashtags to extract the respective word embedding vectors (hashtag #1 and hashtag #2 in FIG. 3B) of the classified words. Thereafter, the context category dataset generating apparatus performs vector additions on the embedding vectors of respective words to obtain the embedding vectors of respective hashtags.

The context category dataset generating apparatus calculates a distance between the extracted or obtained embedding vectors of respective hashtags and the word embedding vectors of the respective context categories and predicts the closer the distance is, the more probable that each hashtag belongs to the relevant context category.

Figure 4:
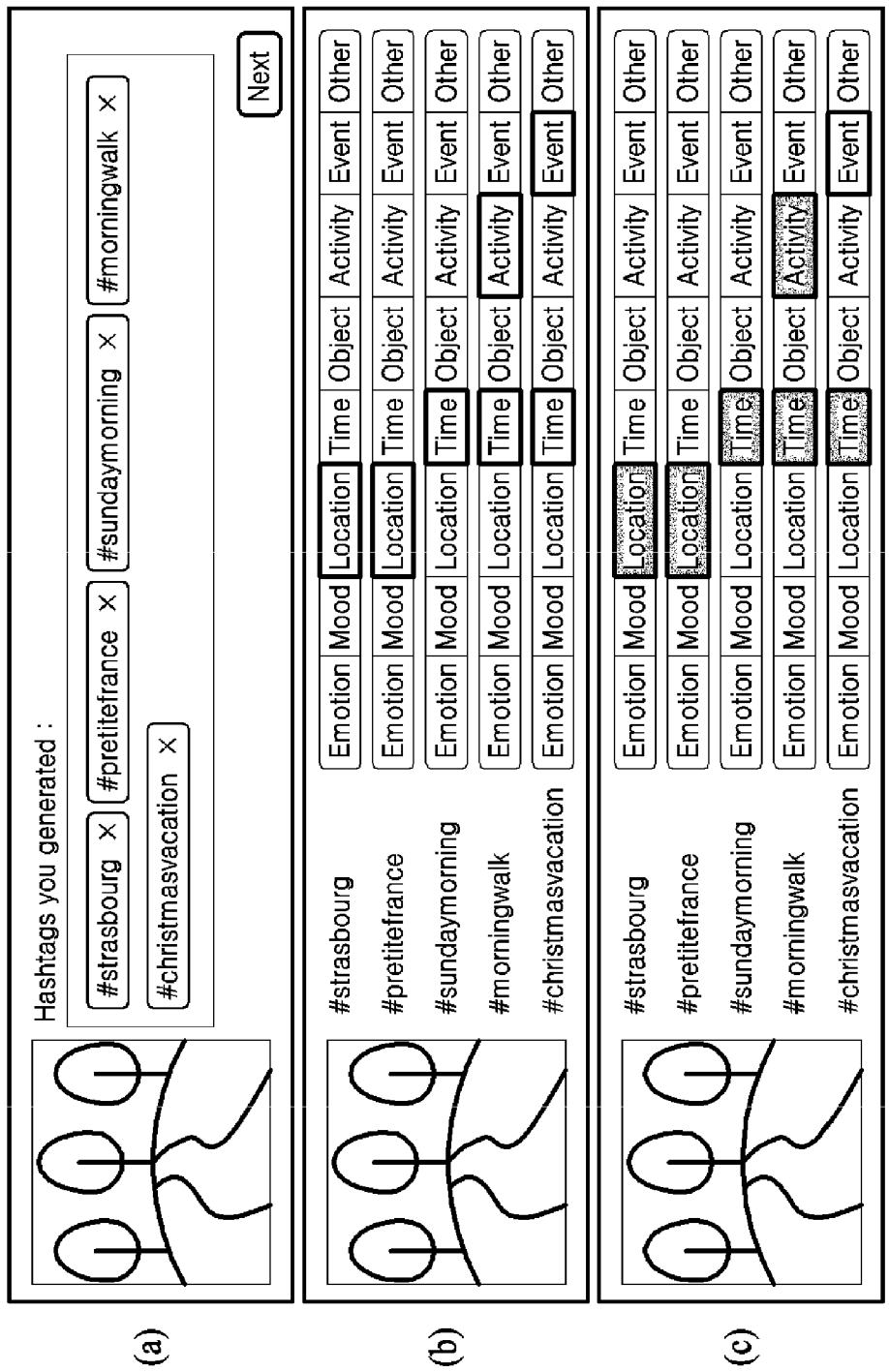
FIG. 4 is diagrams of a user interface according to at least one embodiment of the present disclosure.

FIG. 4 is an exemplary drawing of a user interface according to at least one embodiment of the present disclosure.

The embodiment of FIG. 4 exhibits using an image to establish connectivity between hashtags and context categories. The user inputs an image and hashtag information to the user interface, and upon receiving the context categories predicted and provided by the context category dataset generating apparatus, the user inputs, to the user interface, context category information after selecting or modifying the provided context categories. The context category dataset generating apparatus may utilize the input context category information and the input hashtag information as a basis for regenerating or updating hashtag lists and/or word embedding vectors of the context categories and thereby increase the accuracy of predicting the context categories and accumulate context category datasets.

As shown in FIG. 4 at (a), the context category dataset generating apparatus receives the image and, as hashtag information, one or more hashtags related to the image from a user interface. By receiving the image and the hashtags together, it is assumed that there are some contexts between the input hashtags in relation to the image inputted in tandem. To facilitate the generation of the context category dataset, the user interface preferably prompts to input a hashtag of two or more characters or at least a certain number (e.g., five or more) of such hashtags. Further, in case of making out duplicate a hashtag to collect a hashtag effective for generating the context category dataset, it is preferable to invalidate the deed and prompt the user to make another input.

FIG. 4 at (a) illustrates the input of an image of trees and a river to the user interface, along with its relevant hashtags of #strasboug, #petitefrance, #sundaymorning, #morningwalk, and #christmasvacation.

Accordingly, the context category dataset generating apparatus extracts or obtains the embedding vectors of the respective hashtags included in the hashtag information to predict the context categories, and provides the predicted context categories to the user through the user interface. For easily obtaining the embedding vectors of the respective hashtags, the context category dataset generating apparatus may render the respective hashtags to undergo pre-processing (e.g., classifying hashtags by word, converting between uppercase and lowercase characters, removing spaces or symbols, etc.). FIG. 4 at (b) and (c) illustrates the context categories including, but not limited to, emotion, mood, location, time, object, activity, event, and other.

As shown in FIG. 4 at (b), the context category dataset generating apparatus provides, as the predicted context categories to the respective hashtags, a location category to #strasboug, a location category to #petitefrance, a time category to #sundaymorning, a time category and activity category to #morningwalk, and a time category and event category to #christmasvacation.

FIG. 4 at (c) shows the result of the user selecting the context categories through the user interface. The user has excluded the event category from the context categories of the #christmasvacation hashtag among its provided context categories. The context category dataset generating apparatus updates a hashtag list for each context category based on context category information that is a result of the user's selection. For example, the apparatus may add strasboug and petitefrance to the hashtag list of the location category, add sundaymorning, morningwalk, and christmasvacation to the hashtag list of the time category, and add morningwalk to the hashtag list of the activity category.

Alternatively, the context category dataset generating apparatus may add a hashtag's word to the respective hashtag lists by performing pre-processing of classifying the respective hashtags by word. For example, in place of sundaymorning, morningwalk, and christmasvacation, the apparatus may add sunday, morning, morningwalk, christmas, and vacation to the hashtag list of the time category.

Figure 5:
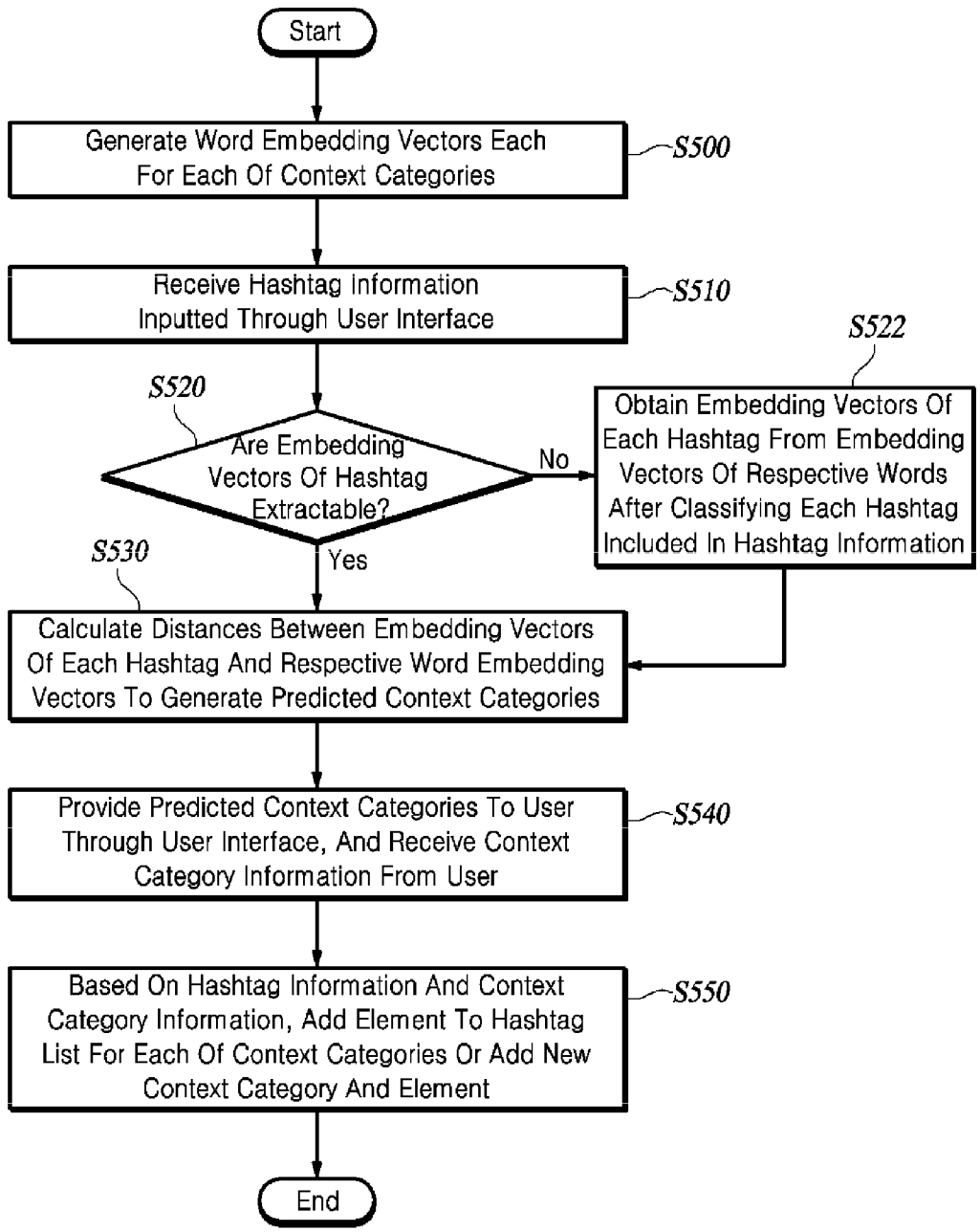
FIG. 5 is a flowchart of a method of generating a context category dataset according to at least one embodiment of the present disclosure.

FIG. 5 is a flowchart of a method of generating a context category dataset according to at least one embodiment of the present disclosure.

The context category dataset generating apparatus generates a word embedding vector for each of the context categories by using hashtag lists for the respective context categories (S500).

The context category dataset generating apparatus is entered hashtag information through a user interface (S510). Such hashtag information may be one or more hashtags related to data (e.g., image, video, document, etc.) uploaded through the user interface.

The context category dataset generating apparatus determines, by embedding vector locations in space, whether or not the input embedding vectors of one or more hashtags included in the hashtag information in receipt are extractable (S520). Upon determining that the embedding vectors are extractable, the apparatus calculates the distance between the embedding vectors of one or more hashtags and the respective word embedding vectors and thereby generates, as predicted context categories, the context categories that correspond to top one or more (or N) word embedding vectors that have the shorter distance (S530). Alternatively, the apparatus generates, as predicted context categories, the context categories that correspond to the embedding vectors whose distances are equal to or greater than a preset threshold.

Upon determining that no embedding vectors are extractable, the context category dataset generating apparatus obtains the embedding vectors of one or more hashtags from the embedding vectors of respective words after classifying the hashtags (S522). Thereafter, the apparatus calculates distances between the embedding vectors of one or more hashtags and the respective word embedding vectors to generate the predicted context categories (S530).

The context category dataset generating apparatus provides the predicted context categories to the user through the user interface and receives context category information from the user (S540). Accordingly, the user inputs the context category information to the user interface in consideration of the predicted context categories.

Based on the hashtag information and context category information, the apparatus adds a new element to the hashtag list for each of the context categories or adds a new context category and an element to a hashtag list in the new context category (S550).

Although the steps in FIG. 5 are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIG. 5 or by performing one or more of the steps in FIG. 5 in parallel, without departing from the gist and the nature of the at least one embodiment of the present disclosure, and hence the steps in FIG. 5 are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs (which are also known as programs, software, software applications, or code) contain instructions for a programmable processor and are stored in a "computer-readable recording medium."

The computer-readable recording medium includes any type of recording device on which data that can be read by a computer system are recordable. Examples of the computer-readable recording medium include non-transitory media such as a ROM, CD-ROM, magnetic tape, floppy disk, memory card, hard disk, optical/magnetic disk, storage devices, and the like and transitory medium such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, or a mobile device.

At least one aspect of the present disclosure provides an apparatus for and method of generating a context category dataset by predicting context one and more categories to which a hashtag inputted by a user may belong and receiving from the user the context categories to which the hashtag is supposed to belong, thereby allowing to preemptively provide a natural language dataset classified in consideration of a human situation and context.

The result of natural language classification in consideration of the human situation and context is useful for the text generation that generates a text describing a specific situation in consideration of the context of the natural language, and for designing and training an intelligent agent for automatically recognizing the user's situation and context to generate apposite vocabulary and sentences, and a machine learning model or artificial intelligence model for the purpose of natural language generation.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for generating a context category dataset by using a user interface, the apparatus comprising:
    a list provider configured to provide a hashtag list for each context category; and
    a category prediction unit configured to use word embedding vectors each generated for each context category based on the hashtag list to predict one or more context categories of one or more hashtags inputted from the user interface,
    wherein the user interface is configured to provide a predicted context category to a user and to receive and provide context category information from the user to the list provider;
    wherein the list provider is configured to generate or update the hashtag list by generating a hashtag list of a new context category based on the one or more hashtags and the context category information, or updating a hashtag list of an existing context category based on the one or more hashtags and the context category information; and
    wherein the list provider is configured to generate or update the hashtag list after performing preprocessing of classifying the one or more hashtags by word.

2. The apparatus of claim 1, wherein each word embedding vector of the word embedding vectors comprises:
    a vector representing a position in a predefined embedding vector space of a context category corresponding to each word embedding vector that is mentioned above.

3. The apparatus of claim 1, wherein the category prediction unit comprises:
    a vector provider configured to generate or update the word embedding vectors; and
    a category predictor configured to predict the one or more context categories to which each hashtag belongs by calculating a probability that each hashtag belongs to each of the one or more context categories by using the word embedding vectors.

4. The apparatus of claim 3, wherein the vector provider is configured to generate the word embedding vectors by assigning, based on one or more basic tags preset in the hashtag list, a centroid of a cluster composed of embedding vectors of the basic tags as word embedding vectors of a relevant context category.

5. The apparatus of claim 3, wherein the vector provider is configured to update the word embedding vectors by reassigning, by further taking account of a word embedding vector of an element when added to the hashtag list, a centroid of a cluster composed of embedding vectors of elements included in the hashtag list as word embedding vectors of a relevant context category.

6. The apparatus of claim 5, wherein the reassigning is performed every time the number of hashtags that are added to the hashtag list reach a preset number.

7. The apparatus of claim 3, wherein the category predictor is configured to generate each of embedding vectors of the one or more hashtags and calculate a distance from each generated embedding vector to each of the word embedding vectors and thereby calculate the probability that each hashtag belongs to each of the one or more context categories.

8. The apparatus of claim 7, wherein the embedding vectors of the one or more hashtags are generated by extracting the embedding vectors from each hashtag, and when no embedding vectors can be extracted from each hashtag, the embedding vectors are generated by classifying each hashtag by word and performing a vector addition on the embedding vectors of respective words.

9. The apparatus of claim 7, wherein the category predictor is configured to predict the one or more context categories of the each hashtag by predicting all or some of the context categories having the embedding vectors of each hashtag, which are each spaced from each of the word embedding vectors by a distance equal to or lower than a preset threshold value.

10. A method of generating a context category dataset, the method comprising steps of:
    generating word embedding vectors each for each of context categories based on a hashtag list for each of the context categories;
    receiving one or more hashtags inputted from a user interface;
    predicting one or more context categories in the one or more hashtags by using the word embedding vectors;
    providing one or more predicted context categories to a user through the user interface;
    receiving context category information inputted from the user; and
    renewing or updating the hashtag list by generating a hashtag list of a new context category based on the one or more hashtags and the context category information, or updating a hashtag list of an existing context category based on the one or more hashtags and the context category information;
    wherein the renewing or updating the hashtag list is performed after performing preprocessing of classifying the one or more hashtags by word.

11. The method of claim 10, wherein the generating of the word embedding vectors comprises:
    assigning a centroid of a cluster composed of embedding vectors of elements included in the hashtag list as word embedding vectors of a relevant context category.

12. The method of claim 10, wherein the predicting of the one or more context categories comprises:
    generating embedding vectors of the one or more hashtags and calculating a distance from each generated embedding vector to each of the word embedding vectors to use the distance as a basis for the predicting.

13. The method of claim 12, wherein the predicting comprises:
calculating a probability to generate a calculated probability that each hashtag belongs to each of the one or more context categories by normalizing a distance for each relevant context category from each generated embedding vector to each of the word embedding vectors, and
selecting top one or more (or N) context categories that have the calculated probability.

14. A computer program stored in a computer-readable medium for executing the steps respectively included in the method of generating the context category dataset according to claim 10.

* * * * *